Oct. 24, 1961 W. D. MOEHRING 3,005,879

BINAURAL MAGNETIC PICKUP HEADS

Filed March 31, 1958 2 Sheets-Sheet 1

INVENTOR.

William D. Moehring

BY

Otto A. Earl

Attorney

BINAURAL MAGNETIC PICKUP HEADS

Filed March 31, 1958 2 Sheets-Sheet 2

INVENTOR.
William D. Moehring
BY
[signature]
Attorney

United States Patent Office 3,005,879
Patented Oct. 24, 1961

3,005,879
BINAURAL MAGNETIC PICKUP HEADS

William D. Moehring, Box 105, Vermontville, Mich.
Filed Mar. 31, 1958, Ser. No. 725,226
14 Claims. (Cl. 179—100.2)

This invention relates to improvements in binaural magnetic pickup heads. The principal objects of this invention are:

First, to provide a magnetic pickup head which can be manufactured for binaural operation with the gaps in the core pieces accurately alined with each other and with the case of the pickup head so that all pickups of a series will operate equally well with a magnetic tape.

Second, to provide a novel assembly in a magnetic pickup head which permits easy assembly of the core pieces and coils in the case with the magnetic gap of the core piece accurately and uniformly alined with respect to the case in all of the heads manufactured to a given pattern.

Third, to provide a novel assembly in a magnetic pickup head which permits accurate finishing of the opposed ends of the core pieces of two spaced magnetic cores and the latter assembly of the core piece parts into a head with the core pieces in accurately predetermined position.

Fourth, to provide a magnetic pickup head in which the relatively small cross section core pieces can be easily formed in laminations of thin material and then finished to provide accurate coplanar relation of the abutting ends of the core pieces.

Other objects and advantages of the invention will be apparent from a consideration of the following description and claims. The drawings, of which there are two sheets, illustrate two highly practical forms of the pickup head with two different types of core pieces mounted therein.

Figure 1:
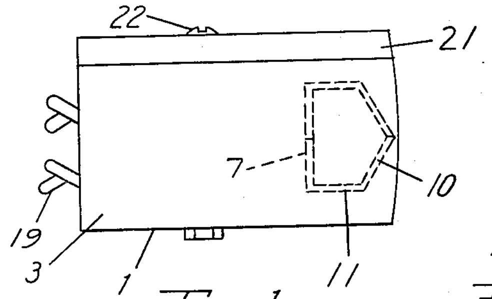
FIG. 1 is a side elevational view of a first form of the pickup head.

It has for some time been recognized in the art of making and using magnetic pickup heads in conjunction with magnetic tapes and the recording or playing back of sounds magnetically recorded on the tape that the magnetic gap in the pickup head over which the tape is translated must be disposed at a specific and very accurately controlled angle with respect to the path of movement of the tape thereacross. This is particularly true when the sound is recorded on a tape by one magnetic device and then reproduced on another pickup head. If the magnetic gaps of the recording head and reproducing head are not alined at the same angle with respect to the tape, there is a rapid loss of efficiency in the reproducing head. Since the magnetic gaps are formed by the core pieces of relatively small dimension, it is difficult to assemble the core pieces into a head in a uniform relation so that any of a series of heads can be easily mounted in a reproducing machine to reproduce sounds with the same efficiency as other machines of the series.

The present invention provides a pickup head assembly in which the alinement of the magnetic gap relative to the case of the head can be accurately and economically controlled. The assembly is applicable to either single or binaural pickup heads, a binaural head being shown as an example.

The head consists generally of a body 1 which is desirably formed as a die casting of non-magnetic metal having a bottom wall 2 and side walls 3—3. The case is open at each end. Near their rear ends the side walls 3 are formed with internal upright grooves 4 that receive and locate a rear wall 5 of electrically insulating material. Near their front ends the side walls 3 define opposed parallel upright slots 6 opening to the inside of the case. The side walls are further provided with internal bosses defining bolt holes for clamping the case together as will be described. The size and location of the slots 6 relative to the outer walls of the casing 1 can be easily and accurately controlled in mass production as they can be formed from the same or identical moulds in successive moulding operations.

The electromagnetic pickup elements consist of magnetic cores 7 which in the case of a binaural head are duplicated in spaced position within the case. Each core 7 consists of a lower core half 8 and an upper core half 9 of generally U-shape. The transverse cross section of the core pieces may be rectangular as shown and if desired the outer arms 10 of the core pieces may be inclined outwardly of the case and laterally toward each other. This brings the gaps of two cores close together for operating on a narrow width of tape while leaving a wider space between their inner arms 15 for mounting coils as will be described. The core halves 8 and 9 have their base cross pieces 11 tapered outwardly in width and firmly secured in tapered notches formed in a lower support bar 12 and an upper support bar 12A. It will be seen that the subassembly of the support bar and the core halves mounted thereon is identical with the upper support bar inverted over the lower support bar. The subassemblies can thus be manufactured economically as a common item used in duplicate in each head. The taper of the bases of the core halves and the notches in the support bars is not essential but is desirable for two reasons. First, it reduces the cross sectional area of the outer portions of the core with respect to the inner portions thereof and this is desirable for the magnetic efficiency of the head. Second, the taper provides a locating engagement between the core half and the support bar that locates all the outer arms of the core halves at the same distance from the support bars.

The support bars 12 and 12A are sized to fit within the slots 6 in the forward ends of the side walls of the case. Prior to being inserted in the case the ends of each core half mounted on a support bar are ground or finished into coplanar relation desirably parallel to the rear face of the support bar. This operation is relatively simple as the support bars can be supported on a flat reference surface while the upper ends of the core halves secured to the support bars are ground to a common plane parallel to the supporting surface.

After the bottom support bar 12 is assembled in the case with its ends retained in the slots 6, plastic coil forms 13 with electrical coils 14 wound therearound are dropped over the upstanding inner arms 15 of the lower core halves. The upper support bar 12 is then assembled in inverted position into the case with the inner arms of its core halves fitting down into the electrical coils till the opposed ends of the core halves are in abutting relation. As it is commonly desirable to magnetically insulate one coil and core from the other, the support bars 12 and 12A are provided with central transverse slots 16 which receive and support the edges of a divider plate 17 to support the plate between the two coils and the cores. The lead wires from the two coils are extended as at 18 to the inner ends of terminals 19 supported in the rear insulating wall 5 and projecting through the rear of the case. A double bowed leaf spring 20 is then placed on top of the top support bar 12A with the ends of the spring retained in the slots 6. A cover 21 is then secured to the top of the case by means of bolts 22 passed through the internal bosses 23 to draw the cover down against the spring 20 and applying light but constant holding pressure on the upper support bar that holds the abutting ends of the core halves 8 and 9 firmly in engagement.

Figure 2:
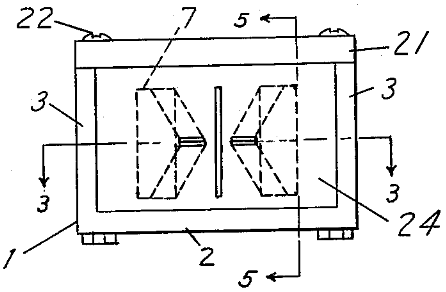
FIG. 2 is a front elevational view of the head shown in FIG. 1.
Figure 3:
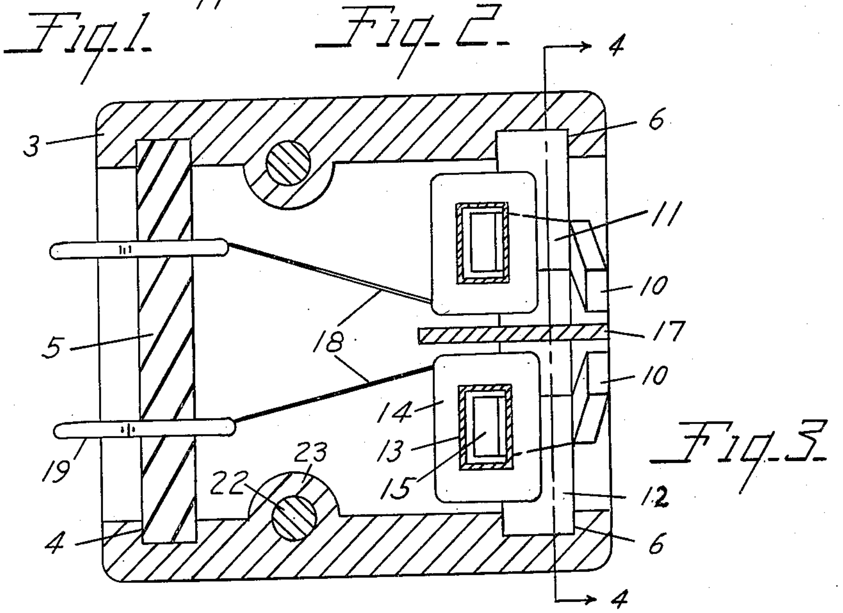
FIG. 3 is a horizontal cross sectional view taken along the plane of the line 3—3 in FIG. 2 and showing the parts in partially assembled relation prior to filling the case with plastic filler.
Figure 4:
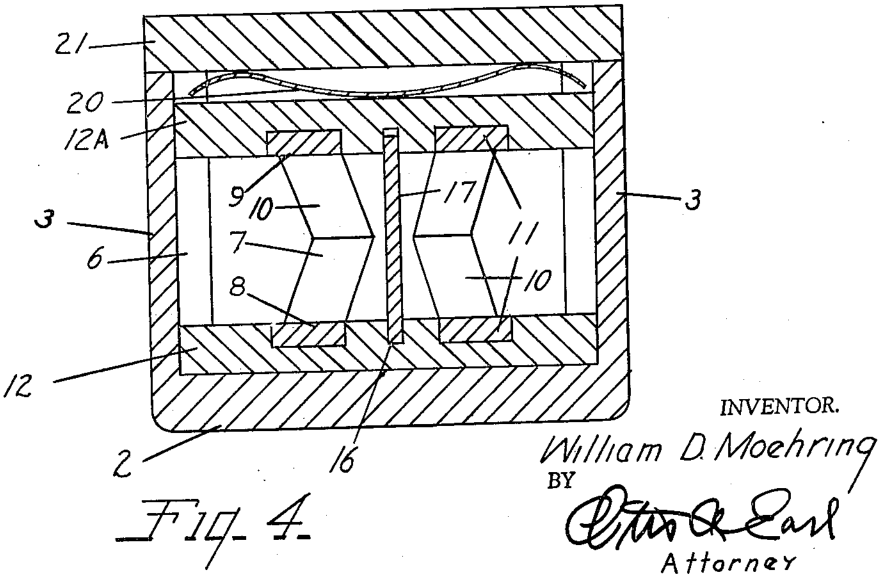
FIG. 4 is a fragmentary vertical cross sectional view taken along the plane of line 4—4 in FIG. 3.
Figure 5:
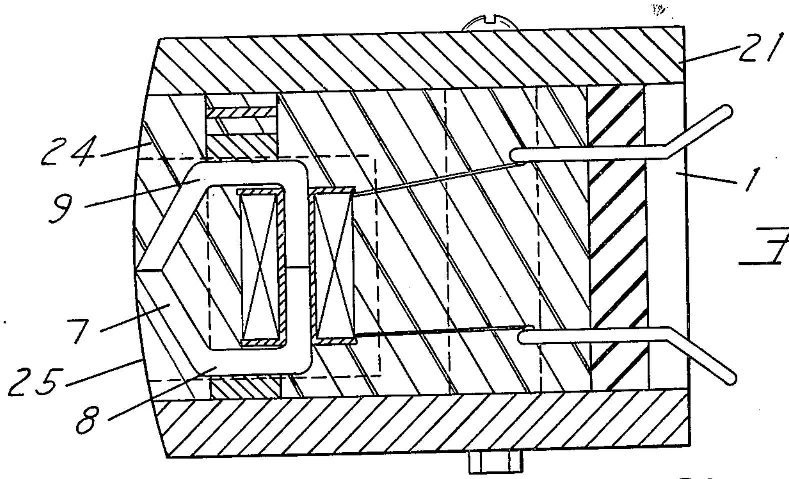
FIG. 5 is a vertical longitudinal cross sectional view taken along the plane of the line 5—5 in FIG. 2.

Since the abutting ends of the several core halves are all coplanar and held against the bottom wall of the housing, the magnetic gaps between the outer ends of the core halves will be parallel to the bottom wall of the case and perpendicular to the planes of the side walls of the case. In order to permanently fix the cores and core pieces in this desired position, a mass of thermosetting plastic material is poured or injected through the front of the case as at 24 in FIGS. 2 and 5 and permitted to harden in place. After the plastic filler has hardened the spring 20 no longer functions as a spring. The front face of the case and the enclosed plastic can be finished along the curved surface as at 25 in FIG. 5 to provide a smoothly rounded surface exposing the magnetic gaps of the cores so that the magnetic tape can be translated thereover.

Figure 6:
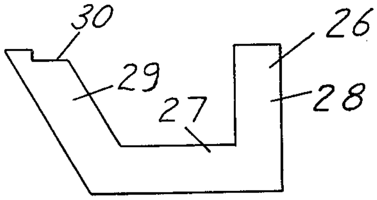
FIG. 6 is a side elevational view of one lamination of a modified form of core piece for use in the pickup head.
Figure 7:
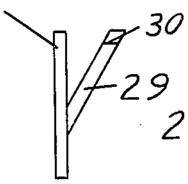
FIG. 7 is an end elevational view of the lamination shown in FIG. 6.
Figure 8:
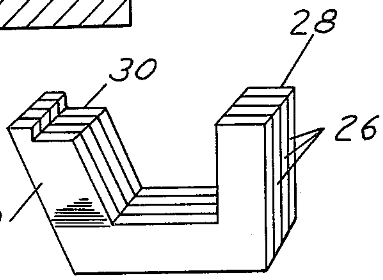
FIG. 8 is a perspective view of a modified form of core piece for the head made up of the laminations shown in FIGS. 6 and 7.

FIGS. 6, 7 and 8 illustrate a modified form of core piece half which can be substituted for the core halves 7 just described. It consists of a plurality of thin U-shaped laminations 26 each having a coplanar base 27 and inner arm 28. The outer arm 29 is inclined outwardly from the base 27 and is further bent laterally from the plane of the base and inner arm as appears most clearly in FIG. 7. The end of each outer arm 29 is notched as at 30 to reduce the area of contact between opposed core piece halves and concentrate the flux at the outer edge of the gap between the core piece halves. As in the case of the solid core piece halves 7 the several laminations 26 may be secured and retained in a notch of a support bar 12 or 12A and ground to bring the ends of the arms 28 and 29 into accurate coplanar relation.

Figures 9, 10:
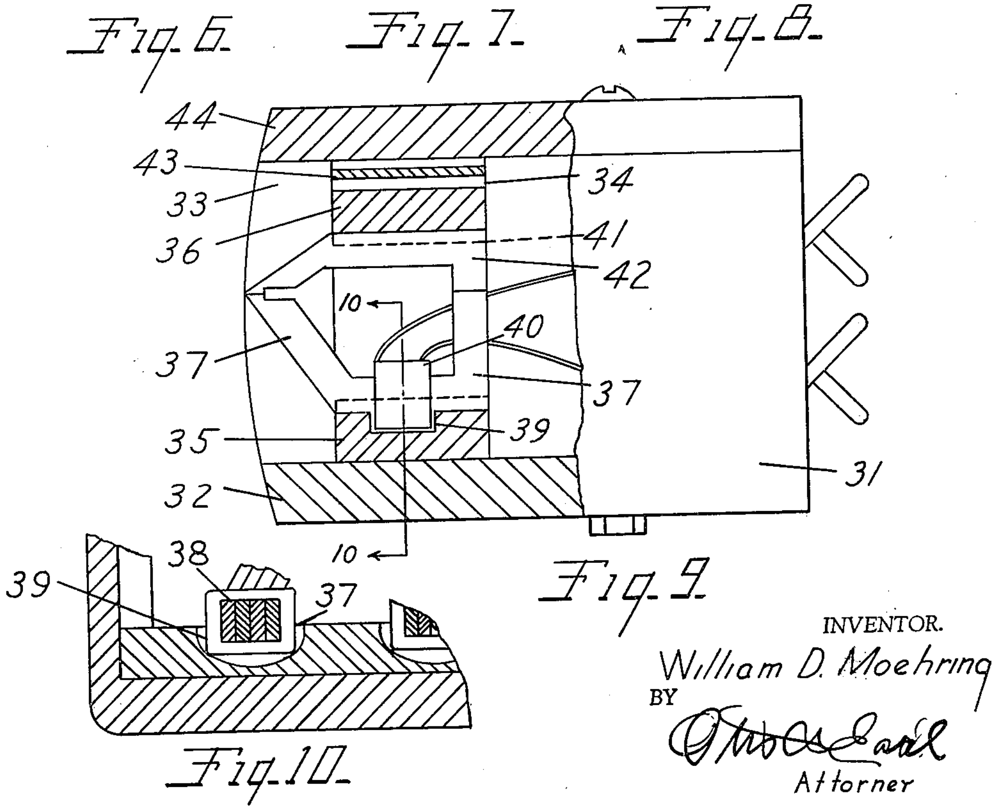
FIG. 9 is a fragmentary cross sectional view corresponding to FIG. 5 but showing a modified form of the pickup head.
FIG. 10 is a fragmentary cross sectional view taken along the plane of the line 10—10 in FIG. 9.

FIGS. 9 and 10 illustrate a modified form of head assembly in which the U-shaped housing 31 has a bottom wall 32 and upstanding side walls 33 with upright slots 34 formed in the side walls near the open end of the case. The slots 34 correspond to the slots 6 in the first form of the case but are wider in order to receive and retain wider support bars 35 and 36. The lower support bar 35 has transversely extending notches 37 formed therein which receive and retain the bases of lower core piece parts 38 which may be laminated as in FIG. 8. The support bar 35 further has recesses 39 milled therein to intercept the notches 37 and provide space for coils 40 that are positioned around the base of the U-shaped core piece 38.

The upper support bar 36 has downwardly facing notches 41 formed therein and receiving and retaining the upper core piece parts 42 in opposed relation to the lower core piece parts 38. As in the first form of the pickup head the ends of the core piece parts are finished to common planes that coincide when the support bars are assembled in the case but it is not essential that the upper core piece parts 42 be identical in shape with the shape of the lower core piece parts 37. The support bars and core piece parts are urged together by a spring 43 held down by the cover 44 of the case.

In all forms of the pickup the alinement of the gaps of the two cores is maintained by reason of finishing the ends of the U-shaped core piece halves to a fixed plane after the two halves have been secured in permanent relation with respect to each other on their supporting bars. In either a binaural core assembly as illustrated or a single core head, the alinement of the magnetic gap or gaps can be easily and accurately determined relative to the case as the engagement of the lower support bar with the bottom wall of the case will be uniform in all assemblies of cases die cast from a common die and support bars having flat surfaces for engagement with the bottom of the case. The grinding of the ends of the core piece halves parallel to the back surface of their supporting bars requires that the upper support bar and core piece half assembly remain in parallel relation to the lower support bar and the bottom of the case.

As is common in magnetic pickup heads a very thin spacer is interposed between the abutted ends of the outer arms of the core piece halves to create a magnetic gap but the inner arms are abutted directly against each other to provide as great magnetic continuity as possible through the core from each side of the gap.

Having thus described the invention, what is claimed as new and is desired to be secured by Letters Patent is:

1. A binaural pickup head comprising a box-like housing having open ends and top, the side walls of said housing defining upright slots adjacent to the front ends thereof, an insulating wall at the rear end of the housing and having electrical terminals mounted therein, a first core support bar supported upon the bottom of said housing and having its ends retained in said slots at the other end of said housing, said first support bar having a central upwardly opening slot formed therein with upwardly opening notches formed in spaced relation on each side of said slot, two half core pieces of U-shaped contour having their bases received and retained in said notches, the outer arms on said half core pieces being inclined outwardly of said case and laterally toward each other, the ends of said half core pieces all being finished to a common plane, a second core support bar and half core piece assembly identical with the first support bar and half core piece assembly mounted in inverted position in said housing with the ends of the second support bar retained in said slots whereby the ends of the half core pieces are in abutting coplanar relation, a divider plate retained in the slots in said support bars between said core pieces, a cover secured to the top of said housing, a leaf spring compressed between said cover and the upper one of said support bars with the ends of the spring retained in said slots to bias the ends of said half core pieces together, a pair of coils mounted around the inner arms of said half core pieces with one coil on each side of said divider plate, electrical connections from said coils to said terminals, and a mass of thermosetting plastic material filling said case around said coils and core pieces, the front end of said case and the outer arms of said half core pieces and the exposed surface of said thermosetting material being finished along a cylindrically curved surface.

2. A binaural pickup head comprising a box-like housing having open ends and top, the side walls of said housing defining upright slots adjacent to the front ends thereof, a wall at the rear end of the housing and having electrical terminals mounted therein, a first core support bar supported upon the bottom of said housing and having its ends retained in said slots, said first support bar having upwardly opening notches formed in spaced relation therein, two half core pieces of U-shaped contour having their bases received and retained in said notches, the outer arms on said half core pieces being inclined outwardly of said case, the ends of said half core pieces all being finished to a common plane, a second core support bar and half core piece assembly mounted in inverted position in said housing with the ends of the second support bar retained in said slots whereby the ends of the half core pieces are in abutting coplanar relation, a cover secured to the top of said housing, a spring compressed between said cover and the upper one of said support bars to bias the ends of said half core pieces together, a pair of coils mounted around the inner arms of said half core pieces, electrical connections from said coils to said terminals, and a mass of thermosetting plastic material filling said case around said coils and core pieces, the front end of said case and the outer arms of said half core pieces and the exposed surface of said thermosetting material being finished along a common surface.

3. A magnetic pickup head comprising a box-like housing having an open end and top, the side walls of said housing defining internal upright slots adjacent to said end and perpendicular to the bottom of the housing, a first core support bar supported upon the bottom of said housing and having its ends retained in said slots, said bar having longitudinally spaced transverse notches formed in its upper surface, first core piece halves of U-shaped contour having their bases received and retained in said notches, the outer arms of said core piece halves being inclined outwardly of said case, a second core support bar having its ends retained in said slots and having transverse notches formed in its undersurface opposed to said first notches, other core piece parts of U-shaped contour having their bases retained in said other notches with their ends extending into opposed abutting relation to said first core piece halves, the ends of said core piece halves and parts being finished to a common plane parallel to the opposite surface of the support bar in which they are retained, said core piece halves and parts being formed of thin U-shaped laminations and having their outer ends notched along the inner corners thereof, said first support bar having longitudinally extending recesses formed therein and intersecting the notches therein, electrical coils positioned around said first core piece halves and extending into said recesses, a cover secured to said housing, and means compressed between said cover and said second support bar to yieldably force the ends of said other core piece parts into engagement with said first core piece halves.

4. A magnetic pickup head comprising a box-like housing having an open end and top, the side walls of said housing defining internal upright slots adjacent to said end and perpendicular to the bottom of the housing, a first core support bar supported upon the bottom of said housing and having its ends retained in said slots, said bar having longitudinally spaced transverse notches formed in its upper surface, first core piece halves of U-shaped contour having their bases received and retained in said notches, the outer arms of said core piece halves being inclined outwardly of said case, a second core support bar having its ends retained in said slots and having transverse notches formed in its undersurface opposed to said first notches, other core piece parts retained in said other notches with their ends extending into opposed abutting relation to said first core piece halves, the ends of said core piece halves and parts being finished to a common plane, said core piece halves and parts being formed of thin U-shaped laminations and having their outer ends notched along the inner corners thereof, electrical coils positioned around said first core piece halves, a cover secured to said housing, and means compressed between said cover and said second support bar to yieldably force the ends of said other core piece parts into engagement with said first core piece halves.

5. A magnetic pickup head comprising a box-like housing having an open end and top, the side walls of said housing defining internal upright slots adjacent to said end, a first core support bar supported upon the bottom of said housing and having its ends retained in said slots, said bar having longitudinally spaced transverse notches formed in its upper surface, first core piece parts received and retained in said notches, a second core support bar having its ends retained in said slots and having transverse notches formed in its undersurface opposed to said first notches, other core piece parts retained in said other notches, part of said core piece parts being U-shaped with their ends extending into opposed abutting relation to the other core piece parts, the ends of said core piece parts being finished to a common plane, said core piece parts being formed of thin laminations and having their outer arms notched along the inner corners thereof, one of said support bars having longitudinally extending recesses formed therein and intersecting the notches therein, electrical coils positioned around said first core piece parts and extending into said recesses, a cover secured to said housing, and means compressed between said cover and said second support bar to yieldably force the ends of said other core piece parts into engagement with said first core piece parts.

6. A magnetic pickup head comprising a box-like housing having an open end and top, the side walls of said housing defining internal upright slots adjacent to said end, a first core support bar supported upon the bottom of said housing and having its ends retained in said slots, said bar having longitudinally spaced transverse notches formed in its upper surface, first core piece parts received and retained in said notches, a second core support bar having its ends retained in said slots and having transverse notches formed in its undersurface opposed to said first notches, other core piece parts retained in said other notches, part of said core piece parts being U-shaped with their ends extending into opposed abutting relation to the other core piece parts, the ends of said core piece parts being finished to a common plane, said core piece parts being formed of thin laminations, electrical coils positioned around said first core piece parts, a cover secured to said housing, and means compressed between said cover and said second support bar to yieldably force the ends of said other core piece parts into engagement with said first core piece parts.

7. A magnetic pickup head comprising a U-shaped core piece, a support bar having a notch therein receiving and locating said core piece, the ends of the arms of said core piece being finished to a common plane generally parallel to the undersurface of said support bar, a second core piece secured in transversely extending relation to a second support bar and having its ends finished to a common plane, a U-shaped housing having upright internal slots formed in the side walls thereof adjacent the end of the housing, said support bars having their ends received and located in said slots with the ends of the core pieces in opposed coplanar relation, a cover secured over the top of said housing, spring means compressed between said cover and said second support bar and holding said core pieces in abutment, and a coil disposed around the inner arm of one of said core pieces, the interior of said housing being filled with a thermosetting plastic material solidified in situ in said housing and around said core pieces and said coil.

8. A magnetic pickup head comprising a U-shaped core piece, a support bar having a notch therein receiving and locating said core piece, the ends of the arms of said core piece being finished to a common plane, a second core piece secured in transversely extending relation to a second support bar and having its ends finished to a common plane, a U-shaped housing having upright internal slots formed in the side walls thereof adjacent the end of the housing, said support bars having their ends received and located in said slots with the ends of the core pieces in opposed coplanar relation, a cover secured over the top of said housing, means compressed between said cover and said second support bar and holding said core pieces in abutment, and a coil disposed around the base of one of said core pieces, the interior of said housing being filled with a plastic material solidified in situ in said housing and around said core pieces and said coil.

9. A magnetic pickup head comprising a U-shaped core piece, a support bar having a notch therein receiving and locating said core piece, the ends of the arms of said core piece being finished to a common plane, a second core piece secured in transversely extending relation to a second support bar and having its ends finished to a common plane, a U-shaped housing having upright internal slots formed in the side walls thereof adjacent the end of the housing, said support bars having their ends received and located in said slots with the ends of the core pieces in opposed coplanar relation, a cover secured over the top of said housing, means compressed between said cover and said second support bar and holding said core pieces in abutment, and a coil disposed around one of said core pieces, the interior of said housing being filled with a plastic material solidified in situ in said housing and around said core pieces and said coil.

10. A magnetic pickup head comprising a U-shaped core piece, a support bar having a notch therein receiving and locating said core piece, the ends of the arms of said core piece being finished to a common plane, a second core piece secured in transversely extending relation to a second support bar and having its ends finished to a common plane, a U-shaped housing, said support bars having their ends received and located in said housing with the ends of the core pieces in opposed coplanar relation, a cover secured over the top of said housing, means compressed between said cover and said second support bar and holding said core pieces in abutment, and a coil disposed around one of said core pieces, the interior of said housing being filled with a plastic material solidified in situ in said housing and around said core pieces and said coil.

11. In a binaural pickup head, a housing having an open end with locating surfaces extending along the insides of the side walls of the housing adjacent said open end, a pair of support bars extending across said housing with their ends located against said locating surfaces, the opposed faces of said bars having notches formed therein that taper transversely of the bars and outwardly toward the open end of the housing, a core piece part of magnetically conductive material and having a central base portion of tapered width secured in and seated against the edges of each of said notches, said core piece parts being U-shaped in planes transverse to said bars with their arms extending in opposed relation toward the ends of other core piece parts carried by the other support bar, the ends of said core piece parts being finished in coplanar relation, means holding said support bars in fixed position in said housing with the ends of the core piece parts on one bar in abutted engagement with the ends of the opposed core piece parts on the other support bar whereby the core piece parts form looped magnetic cores with magnetic gaps at the outer ends of the core piece parts alined along the planes of the finished ends of the core piece parts, and electrical coils positioned around the inner arms of each of said U-shaped core piece parts in each core loop.

12. In a binaural pickup head, a housing having an open end with locating surfaces extending along the insides of the side walls of the housing adjacent said open end, a pair of support bars extending across said housing with their ends located against said locating surfaces, the opposed faces of said bars having notches formed therein that taper transversely of the bars, a core piece part of magnetically conductive material and having a central base portion of tapered width secured in and seated against the edges of each of said notches, part of said core piece parts being U-shaped in planes transverse to said bars with their arms extending in opposed relation toward the ends of other core piece parts carried by the other support bar, the ends of said core piece parts being finished in coplanar relation, means holding said support bars in fixed position in said housing with the ends of the core piece parts on one bar in abutted engagement with the ends of the opposed core piece parts on the other support bar whereby the core piece parts form looped magnetic cores with magnetic gaps at the outer ends of the core piece parts alined along the planes of the finished ends of the core piece parts, and electrical coils positioned around one of said core piece parts in each core loop.

13. In a pickup head, a housing having an open end with locating surfaces extending along the insides of the side walls of the housing adjacent said open end, a pair of support bars extending across said housing with their ends located against said locating surfaces, the opposed faces of said bars each having a notch formed therein that tapers transversely of the bar, a core piece part of magnetically conductive material and having a central base portion of tapered width secured in and seated against the edges of each of said notches, one of said core piece parts having arms extending in opposed relation toward the ends of the other core piece part carried by the other support bar, the ends of said core piece parts being finished in coplanar relation, means holding said support bars in fixed position in said housing with the ends of the core piece part on one bar in abutted engagement with the ends of the opposed core piece part on the other support bar whereby the core piece parts form a looped magnetic core with a magnetic gap at the outer ends of the core piece parts along the plane of the finished ends of the core piece parts, and an electrical coil positioned around one of said core piece parts.

14. In a pickup head, a housing having an open end with locating surfaces extending along the insides of the side walls of the housing adjacent said open end, a pair of support bars extending across said housing with their ends located against said locating surfaces, one face of one of said bars having a notch formed therein that tapers transversely of the bar, a core piece part of magnetically conductive material and having a central base portion of tapered width secured in and seated against the edges of said notch, another core piece part secured in transversely extending relation on the other of said bars, one of said core piece parts having arms extending in opposed relation toward the ends of said other core piece part carried by the other support bar, the ends of said core piece parts being finished in coplanar relation, means holding said support bars in fixed position in said housing with the ends of the core piece part on one bar in abutted engagement with the ends of the opposed core piece part on the other support bar whereby the core piece parts form a looped magnetic core with a magnetic gap at the outer ends of the core piece parts along the plane of the finished ends of the core piece parts, and an electrical coil positioned around part of said core loop.

References Cited in the file of this patent

UNITED STATES PATENTS

| | | |
|---|---|---|
| 2,700,073 | Kleis et al. | Jan. 18, 1955 |
| 2,756,280 | Rettinger | July 24, 1956 |
| 2,806,904 | Atkinson et al. | Sept. 17, 1957 |
| 2,861,134 | Gernert | Nov. 18, 1958 |
| 2,888,522 | McCutchen et al. | May 26, 1959 |

FOREIGN PATENTS

| | | |
|---|---|---|
| 544,162 | Belgium | Jan. 31, 1956 |